United States Patent [19]

Wirstrom et al.

[11] Patent Number: 4,691,355
[45] Date of Patent: Sep. 1, 1987

[54] INTERACTIVE SECURITY CONTROL SYSTEM FOR COMPUTER COMMUNICATIONS AND THE LIKE

[75] Inventors: Peter Wirstrom, Pepper Pike; William H. Cork, Brecksville, both of Ohio

[73] Assignee: Pirmasafe, Inc., Cleveland, Ohio

[21] Appl. No.: 670,326

[22] Filed: Nov. 9, 1984

[51] Int. Cl.$^4$ .............................................. H04L 9/00
[52] U.S. Cl. ........................................ 380/23; 380/25
[58] Field of Search ............... 178/22.08, 22.09, 22.16; 235/379, 380, 382, 382.5, 487; 340/825.31, 825.34; 380/23, 24, 25, 47

[56] References Cited

U.S. PATENT DOCUMENTS

| | | | |
|---|---|---|---|
| 3,764,742 | 10/1973 | Abbott et al. | 178/22.08 |
| 3,800,284 | 3/1974 | Zucker et al. | 340/825.31 |
| 4,145,568 | 3/1979 | Elrat | 178/22.08 |
| 4,207,555 | 6/1980 | Trombly | 235/382.5 |
| 4,277,837 | 7/1981 | Stuckert | 235/380 |
| 4,288,659 | 9/1981 | Atalla | 235/382 |
| 4,295,039 | 10/1981 | Stuckert | 235/380 |
| 4,295,041 | 10/1981 | Ugon | 235/487 |
| 4,302,810 | 11/1981 | Bouricius et al. | 178/22.16 |
| 4,310,720 | 1/1982 | Check, Jr. | 235/382 |
| 4,408,119 | 10/1983 | Decavele | 235/380 |
| 4,454,414 | 6/1984 | Benton | 235/380 |
| 4,471,216 | 9/1984 | Herve | 235/380 |
| 4,475,175 | 10/1984 | Smith | 364/900 |
| 4,523,087 | 6/1985 | Benton | 235/380 |

OTHER PUBLICATIONS

"The 60 Second Password", by Security Dynamics, Jan. 1984.
Cytrol, Inc., "Cylock PC Access and Data Protection," 2 pages, has 1984 copyright date.
MicroFrame, Inc., "New Magnakey," 2 pages, date unknown.
Analytics Communications Systems, "Sherlock Information Security System," 6 pages, is believed to bear a date of 3/84.
Codercard, "Who's Out to Get Your Computer?," 4 pages, date unknown, but 3 of the 4 pages have 1984 printed at the top.
Codercard, "Who's Out to Get Your Computer?, " 7 pages, date unknown.
Codercard, "1984 Annual Report," 12 pages, date unknown.
Remote Systems, Inc., "Shut Down Electronic Piracy," 4 pages, date unknown.

Primary Examiner—Salvatore Cangialosi
Assistant Examiner—Aaron J. Lewis
Attorney, Agent, or Firm—David A. Burge

[57] ABSTRACT

A security control system is provided for interactively identifying and authenticating the authorization of a user of a communications terminal, and optionally providing a means for decoding and encrypting communications signals transmitted to and from the terminal. The system utiizes a security unit that is associated with the terminal, and requires that an encryption device which has been assigned to the user be received in a port that is defined by the security unit in order that the security unit can respond properly to query signals which are sent along a communications link that couples the terminal to other communications equipment. Communications units at both ends of the communications link operate in synchronization such that each new authentication query signal that is sent from one of the units will be answered by an appropriate, newly calculated authenticating signal from the other, whereupon the unit that has sent the query signal checks the received response for correctness of calculation. A feature of the invention resides in requiring that each newly requested authenticating signal differ in a calculated manner from a previously sent authenticating signal, with the manner in which sequential authenticating signals differ being determined, at least in part, by the unique character of the user-assigned encryption device. Optional features that can be included in the encryption device include capabilities to select stored algorithms for use in encrypting, decoding and updating stored encryptions, and to effect control of system operation.

38 Claims, 2 Drawing Figures

INTERACTIVE SECURITY CONTROL SYSTEM FOR COMPUTER COMMUNICATIONS AND THE LIKE

CROSS-REFERENCE TO RELATED APPLICATION

Reference is made to an application entitled COMPUTER COMMUNICATIONS SECURITY CONTROL SYSTEM, Ser. No. 670,471, filed Nov. 9, 1984 Peter Wirstrom and William H. Cork.

BACKGROUND OF THE INVENTION

1. Field of the Invention

The present invention relates to a security control system for interactively identifying authorized users who seek to use remote terminals of a communications system, for establishing and maintaining a secure communications link between such terminals with assurance being provided that the terminals are being operated by authorized users, and for preventing unauthorized use of the equipment even if an unauthorized user succeeds in duplicating an authenticating signal that has been used previously by an authorized user to gain or maintain access to or use the equipment. More specifically, the present invention provides methods for interactively identifying and checking the authority of users of remotely located electronic communications equipment such as remote terminals of a computer network, and for assuring that one or more users of remote terminals of a communications network such as linked terminals of a computer equipment network are duly authorized and/or properly identified so that improper use of the equipment is prevented. Optionally, the system of the present invention provides methods and apparatus for interactively decoding and encrypting communications signals that are transmitted to and from a remote communications terminal, for chosing from among an array of stored algorithms for use in encrypting, decoding and/or updating authorization encryptions, and for effecting signalling and switching as may be desired to control system operation utilizing user-assigned devices that are carried by authorized users and duly safeguarded to maintain system security.

2. Prior Art

The problem of controlling access to and use of remote communications terminals such as communicating data terminal equipment that is linked to a host computer, or to selected programs and/or data stored by a host computer, so that communication can be established and maintained by duly authorized personnel only has become of increasing concern. Moreover, the problem of limiting communications equipment access to duly authorized users has two important objectives that must be taken into account in formulating a suitable solution. While one objective is to establish a system of barriers and obstacles that cannot be traversed or circumvented by unauthorized users, an equally important objective is to assure that such barriers and obstacles as are provided to safeguard against unauthorized access do not unduly hinder either the establishing or maintaining of appropriate access by duly authorized users.

As the number of communicating terminals including personal and business computers has proliferated to the point that communicating data terminal equipment is now readily available, there has been a corresponding increase in the number of persons who have sought to gain unauthorized access to computer equipment such as host computers. Persons who have attempted to gain unauthorized access to host computers have included (1) those who seek access for such illegal purposes as making use of the capabilities of such equipment or for gaining access to and/or manipulating confidential information and/or stored data, and (2) a substantial number of clever people who have taken up the challenge of breaking through computer security systems as something of a fashionable pastime or game wherein they pit their skills and mental acumen against such barriers and obstacles as have been set up by computer security specialists. As users of personal and business computers and other communicating data terminal equipment have become increasingly knowledgeable about such conventional security precautions as passwords and security oriented log-on sequences, the need has become even more paramount for improved methods and apparatus that will serve to properly limit host computer access to duly authorized users without unduly complicating efforts by authorized users to establish and maintain host computer access.

The approach that continues to be utilized most commonly in efforts to control access to such communicating computer equipment as host computers is to require that authorized users transmit a "password," i.e., a purportedly "secret" signal string that is known to the authorized user but not to others, and that is recognized by the host computer as constituting its authorization to permit a predetermined degree of access between the authorized user's terminal and the host computer's facilities and stored data. However, the approach of using one or more passwords as the principal barrier to block unauthorized access has been found to provide only a minimal degree of security inasmuch as authorized users sometimes share their "secret" passwords with colleagues, or the passwords are inadvertently disclosed, discovered, or "broken."

Another approach that has been taken to enhance security between communicating data terminal equipment and a host computer is to provide a "call-back" accessing sequence that must be executed in order for an authorized user to log onto a host computer. In accordance with this practice, the user first establishes communication with a host computer by calling a telephone number that connects with the host. Once the user has successfully completed a first phase of a prescribed log-on procedure, the host computer terminates the original communication link, and then re-establishes communication with the user by placing a separate telephone call to the user at a telephone number where the authorized user is thought to be accessible. The user who has been called by the host computer is then required to complete a second phase of the prescribed log-on procedure.

The call-back approach for logging onto a host computer is often cumbersome to execute, is subject to error that may delay or prevent an authorized user from successfully establishing a needed computer communications link, and requires that an authorized user be stationed at a predetermined location in order to receive the host computer's return call. The requirement of the call-back approach for the host to place a return call to a predetermined telephone number prevents an authorized user from establishing communication with a host computer from such communicating data terminal equipment as may be accessible to the authorized user at locations that are not served by the user's pre-assigned call-back telephone number; thus an authorized user must limit his communications with the host computer to occasions when his schedule brings him to one or a limited number of specific terminals and/or terminal locations. A further problem with the call-back approach is that it is not applicable for use with hard wired networks, or with switchboards, or with networks that include leased lines to which no telephone numbers are assigned. Still further, the security provided by the call-back approach can be defeated through the use of call-forwarding services that are now provided on many telephone exchanges in the United States.

Another proposal that has been made to enhance the security of terminal to host computer communications utilizes installations of hardware in the form of an "accessor" unit that is provided in association with a user's terminal, and a "controller" that is provided in association with a host computer. This proposal is presented in U.S. Pat. No. 4,475,175 issued Oct. 2, 1984, to James G. Smith, the disclosure of which is incorporated herein by reference for its illustration of a typical arrangement of commercially available electrical circuit components that can be utilized to monitor signals being transmitted along a communications link, to store signal string sequences, to transmit stored signal string sequences in response to query signals, to compare signal string sequences that have been transmitted along a communications link to check for propriety, and to take action such as terminating a communications link if a comparison of a received signal string sequence differs from what is deemed to comprise an authorized value.

While the proposal of the Smith patent provides for the use of a dialog between communications equipment at opposite ends of a communications link, with the character of the dialog being essentially transparent to (i.e., unobserved by) the users of the equipment, the proposal does not address the need to assure that the users of linked communications terminals are authorized persons. Rather, the proposal of the Smith patent continues to rely on the use of passwords and/or security oriented log-on sequences to identify users and verify their authority to use linked communications equipment. Rather than to free authorized users to access host computer equipment through the use of a large number of terminals, the Smith proposal is intended for "restricting the number of places from which access can be accomplished." Moreover, because the hardware utilized in implementing the Smith proposal remains in place in an entirely operable state once installed, there are no controlling or key elements that remain within the safeguarded custody of authorized users and that must be present for a terminal of the Smith proposal to be utilized, whereby, in the absence of an authorized user, terminals of the Smith system can be used quite readily by operators who are not authorized users.

While still other proposals have been made for various types of highly technical and expensive methods and apparatus for authenticating the authority of a user of various types of remote communications equipment that is networked or otherwise "linked," the need remains for a versatile, reliable system that will limit communications equipment access to authorized personnel, and that will serve to identify and/or verify the authorization of such persons as seek to use the equipment. While voice print, fingerprint and retinal pattern recognition systems have been proposed to enhance computer security, such proposals are unduly complex and expensive, and are impractical to implement for widespread day to day use by authorized users who need a capability to readily establish communications links with host computers through such data terminal equipment as may be available to them regardless of their locations.

Still another problem associated with establishing secure communications links between networked terminals of communications equipment has been the need to provide a secure but readily usable means for decoding and encrypting signals transmitted to and from each linked terminal. The problem of providing simple and inexpensive methods and apparatus that will effect not only decoding and encryption as well as identification and user authority verification has long eluded those skilled in the art.

3. The Referenced Concurrently-filed Application

The invention of the referenced concurrently filed application addresses and overcomes many of the foregoing and other drawbacks of the prior art by providing a novel and improved communications security system that enables authorized users of communications equipment to readily identify themselves and/or to establish their authority to use and/or access such equipment, and which provides optional means for decoding and encrypting signals transmitted to and from a remote terminal. The system of the referenced application can be utilized, for example, to enable authorized users to identify themselves to and/or to establish their authorization to access a host computer regardless of the location of the data terminal equipment they employ to establish such access. Moreover, the system of the referenced application provides an ever changing, constantly renewed means of identifying and authenticating a user's authorization so that an unauthorized user cannot establish his authorization or gain the access that is sought simply by duplicating a signal string that has been used previously by an authorized user. Still further, the system of the referenced application may be employed to prevent unauthorized users from gaining access to such communications equipment as host computers while, at the same time, doing practically nothing to encumber, complicate or interrupt efforts by authorized users to access and maintain authorized communications. Additionally, the system of the referenced application preferably operates in a manner that is "transparent" to the user, both in the sense that the user need not participate in its operation by remembering, entering and/or executing log-on sequences or passwords, and in the sense that the nature of the procedures that are executed by the system to check and recheck the user's identification and authorization is neither observable nor monitorable by the user.

The invention of the present application builds upon the system of the referenced application to include optional features that provide for additional security through encryption and decoding of communications, and various forms of interactive control that are achieved utilizing user-assigned encryption devices that are "intelligent" rather than totally passive in nature.

SUMMARY OF THE INVENTION

In accordance with the preferred practice of the present invention, such remote communications terminals as are to be utilized by one or more authorized users are each provided with a device that will be referred to herein as a "security unit." Each of the security units is associated with and connected to a separate terminal that may be utilized by authorized users. Each security unit is coupled in series with portions of a communications link through which its associated terminal communicates with other communications equipment such as a host computer. Each authorized user is provided with a unique component or unit that will be referred to herein as an "encryption device." Each encryption device is carried by its authorized user as he or she moves from one location to another. The security units are each provided with a port to receive the encryption devices, and the encryption devices are configured to be removably received in these ports. In preferred practice, the encoded devices that are carried by authorized users each take the form of relatively small cassettes or other small card or cartridge-like, pocket-size structures that are receivable in the ports which are defined by the security units.

With the above-described arrangement of terminal-connected security units and user-assigned encryption devices, the system functions to authenticate a terminal user's authorization by requiring that the user's encryption device be received in the associated security unit's port so that the associated security unit can respond properly to query signals that are sent along the communications link to the user's terminal. Unless a terminal user's encryption device is received in the port of the associated security unit, the security unit cannot generate such authenticating signals as are needed in order to respond properly to the authentication query signals. Absent a proper response to a query signal, communications access will be denied or terminated.

A feature of the preferred practice of the invention lies in requiring that each authenticating signal which is sent in response to each new query signal must differ in a predetermined manner from the user's previous authenticating signal, with the manner in which sequential authenticating signals differ being determined at least in part by the unique encryption of the user's encryption device. Stated in another way, a feature of the preferred practice of the invention lies in causing calculations of the values of new authenticating signals to be made in a synchronized manner both at the user's terminal (i.e., in conjunction with use of the user's encryption device) and at the other end of a communications link by other communications equipment such as a host computer, so that the user's encryption device operating in conjunction with an associated security unit at the user's terminal can respond in a new but proper manner to each new query signal that is issued by the other equipment such as a host computer. The system serves to deny communications access if any one authentication query signal is not answered by a proper new authenticating signal.

The security units include electrical circuitry that monitors such signals as are sent along the communications link, detects authentication query signals being sent to a user's terminal, and causes a suitable authenticating response signal to be sent back along the communications to the source of the query signal. If the source of the query signal is, for example, a host computer, the host has resident within it a program that calls for the sending query signals to the security unit. Because the security unit, when coupled with the user's encryption device, operates to automatically send authenticating signals in response to query signals received from the host computer, no passwords or other security oriented log-on sequences need be used to establish the authority of a user to access a host computer. The authorized user need learn no passwords, and the manner of operation of the computer communications security system is entirely "transparent" to the user.

The system of the invention preferably operates in such a manner that each time an authenticating response signal is summoned from a security unit by the issuance of an authentication query signal, the security unit and the user's encryption device cooperate to determine a valid new authenticating signal that differs in a predetermined manner from the user's last transmission of a valid authenticating signal. The manner in which consecutive authenticating signals differ is determined at least in part by the unique character of the user's encryption device. The unique character of the user's encryption device is also known to the communications equipment at the other end of the communications link, for example a host computer and is taken into account by the host computer in determining the character of each new authenticating signal that it expects to receive in response to each newly issued query signal. By this arrangement, the manner in which authenticating signals are calculated is not disclosed by any of the signal transmissions that pass along the communications link, whereby unauthorized users cannot learn how to calculate the next valid authenticating signal by monitoring signal transmissions. Nor can unauthorized users gain access to the host computer by duplicating a previously used response to an authentication query, for once an authenticating signal has been sent in response to an authentication query signal, that specific authenticating signal will no longer be accepted as valid.

In accordance with features of the present invention, the user-assigned encryption devices optionally may be provided with a variety of means for functioning interactively with other system components to enhance communications security. By way of example, the user-assigned encryption devices may include one or a selectable array of assigned algorithms for use in encryption, decoding and/or updating of stored authentication signal values. Moreover, the user-assigned devices may be provided with operator controls and/or with signalling means for initiating operation of, maintaining control of, and/or indicating the status of the operation of the security system. The user-assigned devices preferably include self-contained power sources and microprocessors to enable them to act intelligently in responding to system signals and, if desired, in generating system commands.

BRIEF DESCRIPTION OF THE DRAWINGS

These and other features and a fuller understanding of the invention may be had by referring to the description and claims that follow, taken in conjunction with the accompanying drawings wherein:

DESCRIPTION OF THE PREFERRED EMBODIMENT

Figure 1:
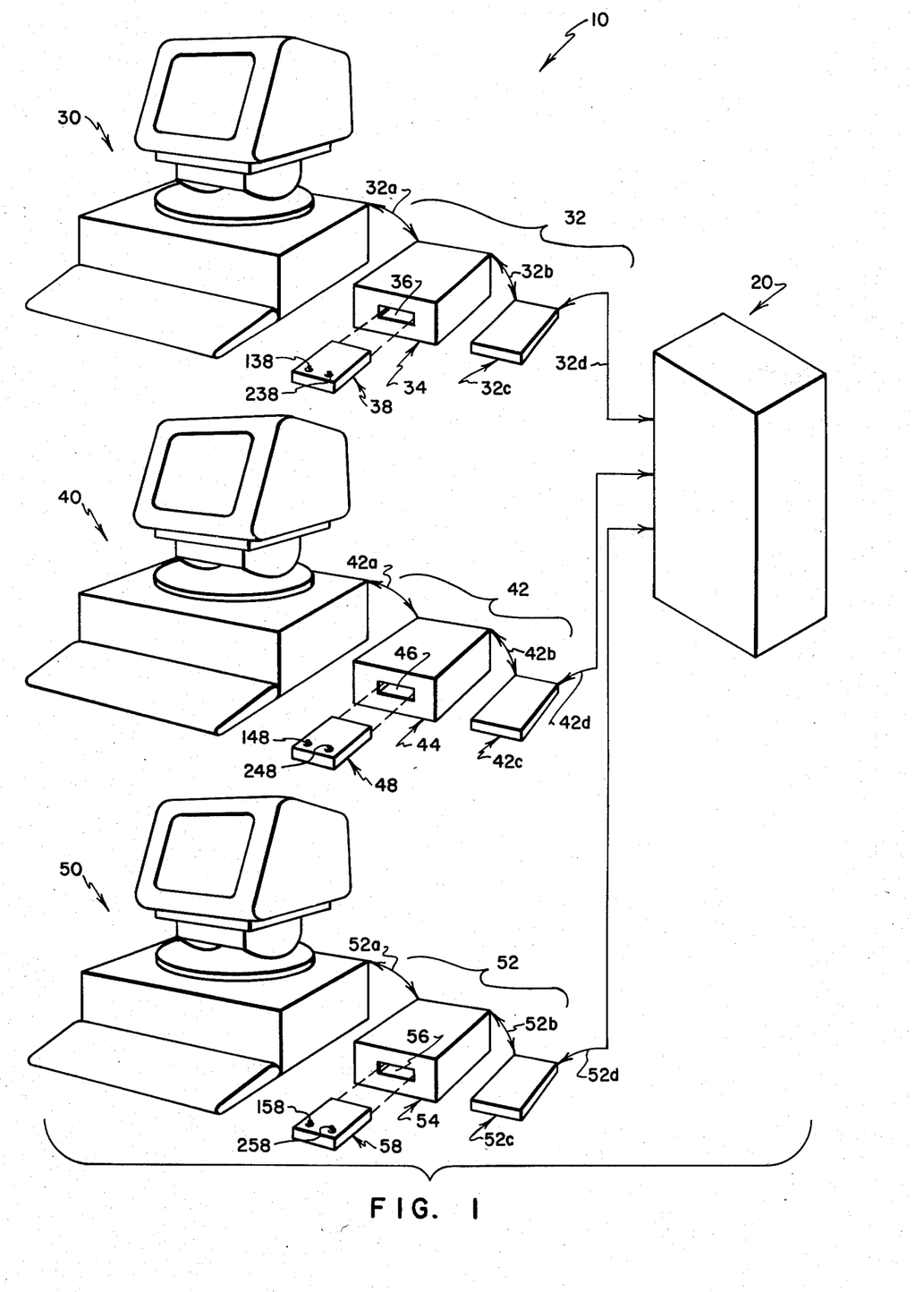
FIG. 1 is a schematic view illustrating features of a computer communications security system that embodies features of the preferred practice of the present invention; and, FIG. 2 is a schematic view, on an enlarged scale, illustrating features of a "security unit" and an "encryption device" that form components of the system of FIG. 1.

Referring to FIG. 1, a communicating computer network system embodying features of the preferred practice of the present invention is indicated generally by the numeral 10. The system 10 includes a host computer 20, a plurality of communicating data terminal equipment units or "terminals" 30, 40, 50, and communication links 32, 42, 52 that are provided for "linking," i.e., transmitting signals between, the host computer 20 and the terminals 30, 40, 50, respectively.

Assigned to and associated with the terminals 30, 40, 50 are devices 34, 44, 54 respectively, each of which is referred to herein by the term "security unit." The security unit 34 is assigned to and associated with the terminal 30, and is interposed between portions 32a, 32b, of the communications link 32. The security unit 44 is assigned to and associated with the terminal 40, and is interposed between portions 42a, 42b of the communications link 42. The security unit 54 is assigned to and associated with the terminal 50, and is interposed between portions 52a, 52b of the communications link 52.

The security units 34, 44, 54 define ports 36, 46, 56, respectively. A plurality of user assigned devices 38, 48, 58 are provided, any one of which may be inserted into (i.e., operably connected to) any one of the ports 36, 46, 56. The devices 38, 48, 58 are each referred to herein by the term "encryption device." Each of the user assigned encryption devices 38, 48, 58 is assigned to a separate person, known as an "authorized user," who has been given authority to communicate with the host computer 20 using one or more of the terminals 30, 40, 50. As will be explained in greater detail, each of the encryption devices 38, 48, 58 has a unique character that serves to identify the person unto whom it has been assigned and/or to evince the authority of such person to access the host computer 20. As will also be explained in greater detail, the user assigned encryption devices 38, 48, 58 cooperate with the security units 34, 44, 54 to generate authenticating signals for responding to authentication query signals that are sent by the host computer 20 along the communication links 32, 42, 52 to establish or reestablish the identification and/or authority of the users of the terminals 30, 40, 50.

In the embodiment of FIG. 1, the host computer 20 is designated in box-like fashion, for its particular type is not of consequence to the practice of the present invention; in preferred practice, the host 20 is a mainframe computer that has communications capability so that its facilities and/or data stored therein can be accessed by such data terminal equipment as the terminals 30, 40, 50. While the terminals 30, 40, 50 shown in FIG. 1 are illustrated schematically as comprising simple data terminal equipment installations (i.e., DTE units), it will be understood that the particular type of communicating data terminal equipment units that form the terminals 30, 40, 50 is not of consequence to the practice of the present invention. While the communications links 32, 42, 52 are illustrated schematically in FIG. 1 as including cables 32a, 32b, 42a, 42b, 52a, 52b, and conventional modem units 32c, 42c, 52c that are connected through conventional telephone lines 32d, 42d, 52d to the host 20, it will be understood that hard wired networks or other types of conventional communication links or components thereof may be used in place of or together with the illustrated components of the communication links 32, 42, 52 without consequence to the practice of the present invention.

While the security units 34, 44, 54 are depicted in FIG. 1 in their preferred form as constituting freestanding structures that are separate from their associated terminals 30, 40, 50, it will be understood that the security units 34, 44, 54 can be attached to or incorporated within the structure of the terminals 30, 40, 50. Stated in another way, it is the manner in which the security units 34, 44, 54 function in cooperation with the host computer 20 and in cooperation with the user encryption devices 38, 48, 58 that is of import to the practice of the present invention. Moreover, as will be readily apparent to those skilled in the art, the functions that are executed by the security units 34, 44, 54 can be performed by a wide variety of arrangements of commercially available electrical circuit components, with the arrangements of these components being selected as a matter of choice of the system engineer such that the resulting arrangement of components will perform the intended functions prescribed herein, whereby details of the construction and arrangement of the components of the security units 34, 44, 54 need not be described. By way of but one example, the above-referenced U.S. Pat. No. 4,475,175 to Smith discloses a typical arrangement of commercially available electrical circuit components that can be utilized to monitor signals being transmitted along a communications link, to store signal string sequences, to transmit stored signal string sequences in response to query signals, to compare signal string sequences that have been transmitted along a communications link to check for propriety, and to take action such as terminating a communications link if comparison of a received signal string sequence differs from what is deemed to comprise an authorized value.

In preferred practice, the security units 34, 44, 54 are identical one with another except in that each of the units 34, 44, 54 has a unique serial number assigned to it that is stored in its electronic memory, as will be explained. The ports 36, 46, 56 that are defined by the units 34, 44, 54 are identical so that each can removably receive any one of the user assigned encryption devices 38, 48, 58. While three security units 34, 44, 54 and three encryption devices 38, 48, 58 have been illustrated in FIG. 1, it will be understood that the system 10 can include a lesser or greater number of either of these components; for instance, more than three terminals 30, 40, 50 can be provided, each of which has at least one of the security units of the type indicated by the numerals 34, 44, 54 associated therewith, and more than three authorized users can be designated, each of which has a unique encryption device such as the devices 38, 48, 58 assigned thereto.

In preferred practice, the encryption devices 38, 48, 58 comprise simple electronic information storage units, with their electronic components carried in a suitable protective housing or enclosure. The devices 38, 48, 58 can have the appearance of cartridges, cards, or the like, as the system engineer may so select. Preferably each of the units 38, 48, 58 includes a pair of separate signal storage areas, one for storing a first encryption that is fixed, for example a signal string that is stored in read-only-memory, and another that stores a second, progressively updated encryption, for example a signal string that is stored in non-volatile random access memory. The first and second encryptions may, for example, comprise signal strings that are representative of six digit numbers such as 222,222 and 444,444, respectively. These two encryptions are utilized as will be described to assist one of the security units 34, 44, 54 in generating appropriate authenticating signals for responding to authentication query signals that emanate from the host computer 20. Moreover, since the first encryption is fixed (i.e., cannot be changed) and is unique to its associated encryption device 38, 48, 58, the first encryption can serve as an identifier or serial number for its associated encryption device.

Figure 2:
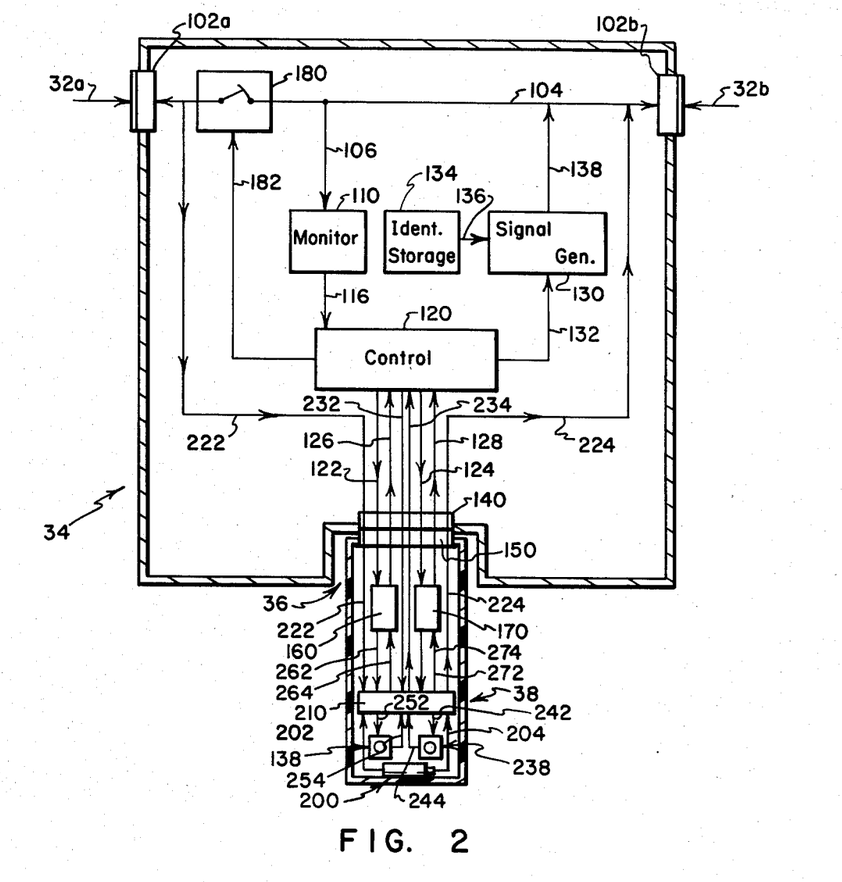

Referring to FIG. 2, the security unit 34 is illustrated schematically as including a pair of electrical connectors 102a, 102b for receiving the cables 32a, 32b, conductors 104 for electrically connecting the connectors 102a, 102b, and a series arrangement of monitoring, control and signalling components designated by the numerals 110, 120, 130, respectively. The control component 120 is coupled to an electrical connector 140 that defines at least a part of the port 36 of the unit 34. The signal generator component 130 is connected to an identification data storage component 134 which serves to electronically store a fixed indication of a unique serial number that has been assigned to the unit 34, for example a signal string that is representative of a six digit number such as 333,333.

As is also illustrated in FIG. 2, the encryption device 38 includes an electrical connector 150 that is configured to mate and electrically connect with the connector 140, and has a pair of memory components that include a read-only-memory component 160 wherein a first encryption is permanently stored, and a non-volatile memory component 170 wherein a second, progressively updated encryption is stored.

In operation, an authorized user who, for example seeks to utilize the terminal 30 for accessing and communicating with the host computer 20, inserts his or her encryption device 38 into the port 36 of the security unit 34 that is associated with the terminal 30. When the encryption unit 38 is properly received by the port 36, electrical connection is established between the electrical connector 140 carried by the security unit 34, and the electrical connector 150 carried by the encryption device 38. Once the encryption device 38 has been inserted into the port 36, the entire interaction of the security unit 34 with the host computer 20 will be totally "transparent" to the user in the senses that the user will need to enter no new passwords nor execute any new log-on sequences, nor will the user observe other types of interactions that take place as a dialog ensues very rapidly between the security unit 34 and the host computer 20 that clears the user's way for access to the host computer 20.

Thus, once the user has inserted his or her encryption device 38 into the port 36 of the security unit 34, with little or no noticeable delay, the terminal 30 can be used in a normal way to initiate the desired type of application interaction with the host computer 20. During the dialog that takes place between the security unit 34 and the host computer 20, a program that is resident within the host computer 20 will send one or a series of authentication query signals along the communications link 32 to the security unit 34. The monitoring component 110 within the security unit 34 will detect the transmission of the authentication query signal or signals, as is indicated in FIG. 2 by the arrow 106. Upon detection of an authentication query signal, the monitor component 110 will signal the control component 120, as is indicated in FIG. 2 by the arrow 116, to cause the control component 120 to operate the signal generator component 130 so that one or a dialoged sequence of authenticating response signals is delivered to the conductors 104, i.e., to the communications link 32, as is indicated in FIG. 2 by the arrow 138.

In preferred practice, the control component 120 operates in response to receipt of the signal 116 from the monitor component 110 to communicate through the electrical connectors 140, 150 with the encryption device 38, as is indicated by arrows 122, 124 in FIG. 2, to read the first and second encryptions that are stored in the sectors 160, 170, respectively, of the encryption device 38. Arrows 126, 128 schematically indicate the transference of readings of the first and second encryptions to the control component 120 from the encryption device 38.

The control component 120 utilizes the first and second encryptions that are read from the encryption device 38 to calculate a portion of a suitable authenticating response signal string, and sends this portion of the authenticating signal string to the signal generating component 130, as is indicated in FIG. 2 by the arrow 132. The control component 120 also sends to the signal generating component 130 a further portion of the authenticating signal string that represents the serial number that has been assigned to the user encryption device 38 (the first encryption that is stored in the memory sector 160 of the device 38 serves well as such a serial number) to the signal generating component 130, as is indicated in FIG. 2 by the arrow 132. By way of example, if the first and second encryptions that are stored within the memory sectors 160, 170 each comprise signal strings that represent six digit numbers such as 222,222 and 444,444, the type of calculation that might be made by the control component 120 to generate the signal portion 132 could be a simple addition of the two values of the two encryptions 222,222 and 444,444 to generate a six or seven digit number, in this case 666,666, that, followed by the serial number of the device 38 (in this case, lets use the first encryption 222,222 as the serial number) to form the complete signal string portion 132 (i.e., a signal string that is representative of the number 666,666,222,222).

The signal generating unit 130 combines the signal 132 that has been received from the control component 120 with a signal portion 136 that is read from the storage component 134 as indicated by the arrow 136 and that is unique to the security unit 34 (e.g., a six digit serial number such as 333,333). The combined resulting authenticating response signal 138 that is delivered to the communications link 32 via the conductors 104 accordingly has a first portion that is representative of a calculation that was made using the encryptions from the memory of the encryption device 38 (in this example, 666,666) a second portion that is representative of the identification of the encryption device 38 (in this example 222,222), and a third portion that is representative of the identification of the security unit 34 (in this case 333,333), whereby the total authenticating response signal string 138 that is transmitted to the conductors 104 for transmission to the host computer 20 (in this case a signal string that is representative of the number 666,666,222,222,333,333) serves to advise the host computer 20 of the fact that an appropriate user encryption device 38 is in place at the terminal 30 and that access to the host computer 20 should therefore be permitted.

Each time the control component 120 reads the contents of the non-volatile memory component 170 of the encryption device 38 and uses the information therefrom in a calculation to generate above-described calculated component of the signal portion 132, the control component 120 also serves to update the second encryption that is stored within the non-volatile memory component 170 of the encryption device 38 so that, the next time that the second encryption is read from the non-volatile memory component 170 for use in calculating a signal portion 132, the character of the calculated signal portion 132 will differ from the previously calculated signal portion 132. This updating can be done automatically or can be done in response to a command signal that is detected by the monitor component 110 as a part of the dialog that takes place between the security unit 34 and the host computer 20. The manner in which the encryption within the non-volatile memory component 170 is caused to be changed between consecutive readings thereof is a matter of the discretion of the system engineer who may choose to use an algorithm that takes into account any of a wide variety of factors including the time of day when the calculation is made, the date when the calculation is made, the character of a portion of the authentication query signal dialog that has been sent from the host computer, etc.

In preferred practice, the manner in which the encryption within the non-volatile memory component 170 is updated between successive readings preferably takes into account one or more of the previously mentioned date, time and query signal factors together with the character of the encryption that is stored within the read only memory portion 160 of the encryption device 38. By way of but one simple example, if the first encryption stored in the read only memory component 160 is representative of a six digit number such as 222,222, and if the encryption that is temporarily stored in the non-volatile memory portion 170 of the device 38 is also a six digit number such as 444,444, updating the encryption within the non-volatile memory component 170 between consecutive readings thereof can be achieved by taking the six digit reading 444,444 of the encryption from the non-volatile memory 170, adding to it the six digit encryption 222,222 from the read only memory component 160, adding to the result therefrom a six digit number such as 122584 that is representative of the month, day and year of the encryption calculation (whereby in this example a final result in the form of the number 89,250 is achieved), and dropping from this resulting number any digits that exceed six in number (while there are no such excess digits in the example given here, if the calculated new encryption exceeded 999,999 in magnitude, any digits representing millions or larger quantities would simply be dropped), the resulting six digit updated encryption (in this example 789,250) would then be transferred by the control component 120 to the non-volatile memory component 170 for storage and future use.

Just as a new calculation is made by the control component 120 operating in conjunction with the encryption device 38 to provide an updated encryption within the non-volatile memory component 170, the host computer 20, knowing all of the same information that is used by the control component 120 to make its updated calculation, can make a similar updated calculation whereby, when a new query signal is sent from the host computer to the control unit 34, the host computer will know, in advance, the character of the authenticating response signal it anticipates receiving from a user device 38 of a particular serial number. By virtue of the character of these calculations being made entirely independently by the control component 120 and by the host computer 20, the manner in which the calculation of a new authenticating response signal is made is not disclosed by the nature of any of the signals that are sent along the communications link 32. Accordingly, even if an unauthorized user succeeds in monitoring the character of the signals that are sent along the communications link 32, the unauthorized user will not be able to determine the character of the calculation that is made to generate the type of continually updated authenticating response signals that are sent by the security unit 34 in response to authentication query signals sent from the host computer 20. By programming the host computer 20 so that authentication query signals are sent along the communications link 32 at periodic intervals during communication sessions, a check can continually be made of the presence of an authorized user's encryption device 38 in the port 36 of the security unit 30 so that the host computer 20 will be reassured that such communication as is being maintained with the terminal 30 is being supervised by an authorized user.

If a fault in the communications link 32 should cause an initial attempt to access the host computer 20 to fail, the system components as described above are preferably arranged to automatically perform at least one, and preferably two, additional attempts to identify and/or verify the authorization of the user of the terminal 30. If the user has forgotten to insert his encryption device 38 into the port 36, or has done so improperly, the control component 120 will not be able to interact with the device 38 as has been described, and will preferably generate a signal string portion that will be understood by the host computer 20 as representing a failure of connection with one of the devices 38, 48, 58. If the host computer 20 anticipates receiving an authenticating signal other than the one that is received from the device 38, the security supervisor can either decide to accept the signal that is received, or can require that the authorized user return his encryption device 38 for maintenance or replacement as may be appropriate.

Moreover, by programming the host computer 20 so that it will maintain a log of the communication sessions that are conducted by authorized users and of attempts made by unauthorized users to establish communication with the host computer 20, useful records will be generated which will enable a security manager to determine who has been utilizing the host computer 20, what difficulties (if any) that have been encountered by particular authorized users in establishing and maintaining host computer access, and the character of any attempts made by persons who may have been trying to obtain unauthorized access to the host computer 20.

The foregoing features of the description of the preferred embodiment are included in the subject matter of the referenced, concurrently-filed application. The features which will now be described are optional to the operation of the system of the referenced application. These features provide a means for further enhancing system security by enhancing the construction, operation and function of the user-assigned encryption devices 38, 48, 58. In accordance with features of the present invention, the user-assigned devices 38, 48, 58 can participate in such functions as the encryption and decoding of signals, the storage, selection and use of algorithms for encryption, decoding and updating of stored encryptions, and in such signalling and switching functions as are involved in controlling system operation.

Referring to FIG. 1, the user-assigned encryption devices 38, 48, 58 may be provided with signalling or control components 138, 148, 158 and 238, 248, 258 respectively. The components 138, 148, 158 preferably take the form of button-type switches, while the components 238, 248, 258 preferably take the form of indicators that may be illuminated when energized, such as light emitting diodes. While the devices 38, 48, 58 are shown as being provided with only one control component and only one signalling component, it will be understood that these components are shown solely for purposes of illustrating one form that such components may take, and that a plurality of such components can be included as elements of any of the user-assigned devices 38, 48, 58.

Referring to FIG. 2, additional components and functions are illustrated schematically in conjunction the depiction of the user-assigned encryption device 38. To begin with, the device 38 is provided with a power source in the form of a battery 200 that is connected, as as indicated by arrows 202, 204, to power a microprocessor control component 210. The microprocessor control component 210, in turn, is preferably coupled through the connectors 140, 150 to the DTE and DCE connectors 102a, 102b as is indicated by arrows 222, 224, and to the control components 120 as is indicated by arrows 232, 234. The microprocessor control component 210 is also preferably connected to the memory components 160, 170, as is indicated by arrows 262, 264 and 272, 274, respectively.

By the above-described arrangement, the microprocessor control component 210 can be provided with any of a wide variety of selectable or predetermined functions, and can operate in cooperation with the control component 120 of the security unit 34 as will be described. Because the selection and arrangement of electrical circuit elements used to form what is referred to herein as the microprocessor control component 210 is a matter of choice with the system engineer, the details of the construction and arrangement of such elements need not be described. Rather, the various functions that such elements may be chosen to perform will be described, from among which the system engineer will choose in order to determine a suitable arrangement and selection of circuit elements that will be employed to perform these functions.

In preferred practice, the control component 210 operates in conjunction with the control component 120 to operate the switch component 180 of the security unit 34 in response to detection by the monitor component 110 of a predetermined command signal that is transmitted along the communications link 32, , whereby such signal transmissions are not directly passed between the DCE and DTE connectors 102a, 102b by the conductors 104; rather such signal transmissions as pass between the DCE and DTE connectors 102a, 102b are directed through and possibly altered in character by the control component 210, as is indicated by arrows 222, 224. Thus, when desired, the control component 210 can perform encryption and/or decoding functions in accordance with one or more suitable algorithms that are stored by the control component 210 or by one or the other of the memory components 160, 170. If a plurality of such algorithms are stored and are held available for use, selection of the desired algorithms for encryption and/or decoding can be made in response to monitored command signals transmitted along the communications link 32, or through the use of the button 138 or other suitable controls (not shown) that may be provided on the user assigned device 38 or on the security unit 34. The button 138 may also be used for such functions as changing between sets of communications parameters or protocols, for example to signal the system 10 to change from use of one baud rate to another in signal transmissions.

The status of the operation of the system 10 can be indicated to the user, as well as any need the system 10 may have for a user response, by illumination of the signal device 238 which is controlled by the control component 210, as is indicated by the arrows 242, 244. The user-operable button 138 is likewise preferably connected to the control component 210, as is indicated by the arrows 252, 254, so that signals inputted from operation of the button 238 are delivered to the control component 210.

In addition to performing encryption and/or decoding functions, the user-assigned device 38 may have stored either within the control component 210 or within one or both of its storage components 160, 170 a plurality of algorithms that may be selectively used to effect updating of the second encryption signal string that is stored within the non-volatile memory component 170, as has been described. Selection of a particular algorithm for use may be made either by utilizing a control such as the button 138, or in response to the monitoring of a predetermined command signal from one or the other of the DTE or DCE connectors 102a, 102b.

As a further option, the dialog that takes place between the security unit 34 and the host computer 20 may be arranged such that it requires user participation by operating the button 138 (or some other suitable control that is not shown) at a particular phase during the dialog, as for instance at a time when an indication is provided to the user by illumination of the indicator 238. These and other interactive options that can be included as a part of the arrangement and prescribed function of the user-assigned encryption devices 38, 48, 58 will be apparent from the foregoing description to those skilled in the art.

As will also be apparent from the foregoing description, the present invention provides a novel and improved system for limiting communications equipment access to authorized users. The system of the invention provides a means of preventing unauthorized access to such communications equipment as host computers while providing no obstacle or encumbrance to authorized users who seek to establish host computer access. Moreover, by providing an option of incorporating within the user encoded devices 38, 48, 58 a variety of means that can interact with other components of the system 10 to perform such functions as encryption, decoding, algorithm selection, signalling and system control, the degree of system security that is provided through the user of the described user-assigned, user-safeguarded devices 38, 48, 58 is greatly enhanced.

Although the invention has been described in its preferred form with a certain degree of particularity, it is understood that the present disclosure of the preferred form has been made only by way of example, and that numerous changes in the details of construction and combination and arrangement of procedures and parts may be made without departing from the spirit and scope of the invention as hereinafter claimed. It is intended that the patent shall cover by suitable expression in the appended claims, whatever features of patentable novelty exist in the invention disclosed.

What is claimed is:

1. Apparatus for vertifying the authorization of a user of at least one communications station that is connected for accessing another communications station through a communications link, the apparatus comprising:

(a) encryption means for being carried by an "authorized user," namely a person who is authorized to use at least one communications station to access another communications station through a communications link that connected the at least one station to the another station, the encryption means including a first encryption that has a value which has been assigned to the authorized user as an indicator of the authorized user's authority to access the another station and a second variable portion representing the time of the last successful access of the another station;

(b) security means interposed in series between portions of the communications link for monitoring signals that are transmitted along the communications link, the security means defining port means for receiving the encryption means and for cooperating with the encryption means to detect a predetermined authentication query signal sequence of monitored signals that is transmitted along the communications link from the host computer and, in response to such detection, effecting transmission of an autheniticating signal sequence along the communications link, to the host computer with the value of the authenticating signal sequence being determined at least in part by the value of the first encryption and of a further encryption resident in said security means and representative of the identity of a predetermined terminal associated therewith so that the value of the authenticating signal sequence constitutes an indicator of the user's and terminal's authority to access the another station;

(c) authorization check means connected to the communications link for entering into a communications dialog with the security means as by transmitting the predetermined authentication query signal sequence along the communications link so that the authentication query signal sequence, when detected by the security means, will cause the security means to transmit the authenticating signal sequence along the communications link to indicate to the authorization check means whether the authorized user's encryption means is received by the port means for cooperating with the security means to cause the authenticating signal sequence to constitute an indication of the user's authority and the particular connected terminal's authority to access the another station; and, (d) the encryption means including control means for interactively cooperating with the security means in the conduct of said dialog whereby, in the absence of the encryption means being received by the port means, said dialog cannot be properly conducted.

2. The apparatus of claim 1 wherein the security means includes means for cooperating with the control means to assure that each newly detected authentication query signal sequence will result in the transmission of an authenticating signal sequence that has a value which differs from the value of a previously transmitted authenticating signal sequence, with the difference between the value of a consecutively transmitted authenticating signal sequences being determined at least in part by the value of the first encryption.

3. The apparatus of claim 2 wherein the security means includes storage means for storing at least one algorithm that can be used in calculating at least a portion of an authenticating signal sequence, a first algorithm stored by the storage means, and the first algorithm is utilized by the control means in calculating at least a portion of an authenticating signal sequence such that said difference between the values of consecutively transmitted authenticating signal sequences is determined at least in part by the first algorithm.

4. The apparatus of claim 2 wherein a plurality of selectable algorithms are stored within the storage means for use by the control means, and the control means is operable to select from among the stored algorithms for use in calculating at least a portion of an authenticating signal sequence.

5. The apparatus of claim 1 wherein:
(a) the encryption means includes first electrical signal storage means for retaining therein, on at least a temporary basis, a first multi-bit value, the value of which is representative of the first encryption; and,
(b) the security means and the control means cooperate to cause the value of the first encryption to be read from the first signal storage means and to be utilized by the control means as a part of effecting transmission of an authenticating signal sequence, and to cause the character of the authenticating signal sequence to be determined, at least in part, by the value of the first encryption.

6. The apparatus of claim 1 wherein:
(a) the encryption means includes second electrical signal storage means for retaining therein, on at least a temporary basis, a second multi-bit value electrical signal string, the value of which is representative of a secod encryption that can be progressively updated; and,
(b) the security means and the control means cooperate to cause the second encryption to be read from the second signal storage means and to be utilized by the control means as a part of effecting transmission of an authenticating signal sequence, and to cause the character of the authenticating signal sequence to be determined, at least in part, by the value of the second encryption.

7. The apparatus of claim 6 wherein the security means includes means for cooperating with the control means to assure that each newly detected authentication query signal sequence will result in the sending of an authenticating signal sequence that has a value which differs from the value of a previously transmitted authenticating signal sequence, with the difference between the values of consecutively transmitted authenticating signal sequences being determined at least in part by the value of at least a selected one of the first and second encryptions.

8. The apparatus of claim 7 wherein the security means includes storage means for storing at least one algorithm that can be used in calculating at least a portion of an authenticating signal sequence, a first algorithm is stored by the storage means, and the first algorithm is transmitted by the control means in calculating at least a portion of an authenticating signal sequence such that said difference between the values of consecutively transmitted authenticating signal sequences is determined at least in part by the first algorithm.

9. The apparatus of claim 8 wherein a plurality of selectable algorithms are stored within the storage means for use by the control means, and the control means is operable to select from among the stored algorithms for use in calculating at least a portion of an authenticating signal sequence.

10. The apparatus of claim 6 wherein the security means and the control means cooperate to cause the second encryption to be updated to a new value once the second encryption has been so read, with the new value being determined, at least in part, by the value of the first encryption.

11. The apparatus of claim 1 wherein the encryption means includes a user operable means for inputting a control signal to the control means.

12. The apparatus of claim 1 wherein the encryption means includes signal means for providing an indication of status of operation of the apparatus.

13. The apparatus of claim 1 wherein the control means includes microprocessor means.

14. The apparatus of claim 1 wherein the encryption means includes a self-contained power source.

15. The apparatus of claim 1 wherein the encryption means includes encoding means having at least one algorithm stored therein for encrypting uncoded signals that are transmitted along the communications link.

16. The apparatus of claim 1 wherein the encryption means includes decoding means having at least one algorithm stored therein for decoding encrypted signals that are transmitted along the communications link.

17. Apparatus for verifying the authorization of a user of communicating data terminal equipment for accessing a host computer through a communications link, the apparatus comprising:
(a) user assigned means for being carried by an "authorized user," namely a person who is authorized to use communicating data terminal equipment to access a host computer through a communication link, the user assigned means defining first encryption means for serving as an indication of the authority of the authorized user to use communicating data terminal equipment to access the host computer through a communication link, second encryption means for representing the time of a past successful access to the host computer, and including control means for interpreting and responding to predetermined signals;
(b) terminal assigned means for being connected to communicating data terminal equipment that is to be utilized by an authorized user to access a host computer through a communications link, and for being interposed in series between portions of the communications link for monitoring signals that are transmitted along the ccommunications link, and for directing predetermined monitored signals to the control means;
(c) port means connected to the terminal assigned means for receiving the user assigned means and for operably connected the terminal assigned means thereto such that the user assigned means and the terminal assigned means cooperate to detect and respond to a query signal sent along the communications link from the host computer, with the response taking the form of an authenticating signal sent along the communications link to the host computer, with the character of the authenticating signal being determined at least in part by the first and second encryption means, whereby the authenticating signal constitutes an indicator of the authorized user's authority to access the host computer; and,
(d) authorization check means at the host computer for generating the query signal that, when monitored by the terminal assigned means will cause the terminal assigned to generate the authenticating signal to indicate to the authorization check means whether the user assigned means is received by the port means for cooperating with the terminal assigned means to cause the authenticating signal to constitute an indication of the user's authority to access the host computer, for maintaining continuity of the communications link upon receiving a predetermined authenticating signal, and for terminating communications along the communications link upon receiving an authenticating signal that is other than said predetermined authenticating signal.

18. The apparatus of claim 17 wherein the control means is operable to assure that each newly detected query signal will result in the transmission of an authenticating signal that differs from a previously transmitted authenticating signal, with the difference between consecutively transmitted authenticating signals being determined at least in part by the character of the first encryption means.

19. The apparatus of claim 17 wherein:
the user assigned means includes first electrical signal storage means for retaining a first multi-bit value therein.

20. The apparatus of claim 19 wherein:
(a) the user assigned means includes second electrical signal storage means for at least temporarily retaining a second multi-bit value therein;
(b) second encryption means in the form of said second multi-bit value stored in the second electrical signal storage means; and,
(c) the control means is operable such that, in the sending of the authenticating signal, the second multi-bit value of the second encryption means is read, and the character of the authenticating signal is determined at least in part by the content of the second encryption means.

21. The apparatus of claim 20 wherein the terminal assigned means and the user assigned means cooperate to cause the second multi-bit value to be updated to a new value once the second multi-bit value has been read and utilized in determining the character of the authenticating signal.

22. The apparatus of claim 20 wherein the user assigned means includes encoding means having at least one algorithm stored therein for encrypting uncoded signals that are transmitted along the communications link.

23. The apparatus of claim 20 wherein the user assigned means includes decoding means having at least one algorithm stored therein for decoding encrypted signals that are transmitted along the communications link.

24. A method of providing a communication link for transmitting signals between a host computer and at least one terminal that is operated by an authorized user, the method comprising the steps of:
(a) providing encryption means for being carried by a person who is authorized to use a terminal to access a host computer through a communications link, with the encryption means including a first fixed encryption that is assigned to the authorized user an an indicator of his authority to access the host computer, a second variable encryption representative of the time of prior successful authorized access with the host computer and including a first algorithm together with encoding means for encrypting uncoded signals that are transmitted along the communications link, and for decoding encrypted signals that are transmitted along the communications link;

(b) providing security means interposed between portions of the communications link for monitoring signals as they are transmitted along the communications link between the terminal and the host computer, the security means serving to define port means for receiving the encryption means and to cooperate with the encryption means to detect a predetermined authentication query sequence of monitored signals and, in response to such detection, to effect transmission of an authenticating signal sequence along the communications link, with the character of the authenticating signal sequence being determined at least in part by the encryption of the user's encryption means so that the authenticating signal sequence constitutes an indicator of the user's authority to access the host computer;

(c) providing authorization check means for generating the predetermined authentication query sequence that, when monitored by the security means will cause the security means to generate the authenticating signal sequence;

(d) positioning the encryption means to be received by the port means;

(e) operating the authorization check means to the predetermined authentication query signal sequence along the communications link;

(f) operating the security means to detect the predetermined authentication query signal sequence and to cooperate with the encryption means to effect transmission of the authenticating signal sequence;

(g) operating the authorization check means to maintain continuity of the communications link upon receiving a predetermined authenticating signal sequence, and to terminate communication of signals along the communications link upon receiving an authenticating signal sequence that is other than said predetermined sequence and, (h) operating the encoding means to encrypt uncoded signals that are transmitted along the communications link and to decode encrypted signals taht are transmitted along the communications link.

25. The apparatus of claim 24 wherein the terminal assigned means and the user assigned means cooperate to cause the second encryption to be updated to a new value once successful access with the host computer has been effected.

26. A method of providing a secure communication link for transmitting signals between a host computer and at least one terminal that is operated by an authorized user, the method comprising the steps of:

(a) providing encryption means for being carried by a person who is authorized to use a terminal to access a host computer through a communications link, with the encryption means including a first encryption having a fixed value that is assigned to the authorized user as an indicator of his authority to access the host computer, a second encryption that is progressively updated to represent the time of a prior successful access to the host computer after each reading of its value, and control means for updating the value of the second encryption after each reading of its value, with the difference between consecutive values of the progressively updated second encryption being determined at least in part by the value of the first encryption;

(b) providing security means interposed between portions of the communications link for monitoring signals that are transmitted along the communications link, the security means serving to define port means for receiving the encryption means and to cooperate with the encryption means to detect a predetermined authentication query sequence of monitored signals and, in response to such detection, to effect transmission of an authenticating signal sequence along the communications link, with the value of the authenticating signal sequence being determined at least in part by the value of first encryption so that the value of the authenticating signal sequence constitutes an indicator of the user's authority to access the host computer;

(c) providing authorization check means associated with the host computer for generating the predetermined authentication query sequence that, when monitored by the security means will cause the security means to generate the authenticating signal sequence;

(d) positioning the encryption means to be received by the port means; and (e) conducting a user authorization check by:
  (i) operating the authorization check means to generate the predetermined authentication query signal sequence;
  (ii) operating the security means to detect the predetermined authentication query signal sequence and to cooperate with the encryption means to effect transmission of the authenticating signal sequence;
  (iii) operating the authorization check means to maintain continuity of the communications link upon receiving an a predetermined authenticating signal sequence, and to terminate communication of signals along the communications link upon receiving an authenticating signal sequence that is other than said predetermined sequence; and,
  (iv) operating the control means to update the value of the second encryption.

27. The method of claim 26 including the steps of conducting communications along the communications link between the host computer and the terminal, with such communications being interrupted at least once to conduct a further user authorization check by:

(a) operating the authorization check means to transmit the predetermined authentication query signal sequence along the communications link;

(b) operating the security means to detect the predetermined authentication query signal sequence and to cooperate with the encryption means to effect transmission of the authenticating signal sequence;

(c) operating the authorization check means to maintain continuity of the communications link upon receiving said predetermined authenticating signal sequence, and to terminate communication of signals along the communications link upon receiving an authenticating signal sequence that is other than said predetermined sequence; and, (d) operating the control means to update the value of the second encryption.

28. The method of claim 26 wherein the step of effecting transmission of an authenticating signal sequence includes the step of calculating a new value to be used for the authenticating signal sequence so that no two consecutively used authenticating signal sequences have values that are identical, and so that the calculated difference between the values of consecutively used authenticating signals sequences is controlled, at least in part, by at least one of the values of the first and second encryptions.

29. The method of claim 26 additionally including the steps of:
(a) providing within the encryption means first and second storage means for retaining therein, at least temporarily, first and second multi-bit values;
(b) storing in the first storage means a first multi-bit value representing the value of said first encryption; and,
(c) storing in the second storage means a second multi-bit value representing the value of the second encryption.

30. A method of establishing the authority of a user of a station of communications network to use facilities of the communications network, comprising the steps of:
(a) providing in authorized user with encryption means (1) for carrying a first encryption that has a value which is representatrve of the authority of the user to utilize at least one station of a communications network to communicate through the network with means defining another station of the network, and (2) for carrving a second encryption that is progressively updated after each reading of its value to represent the time of the last successful communication through the network, and control means for updating the value of the second encryption after each reading of its value, with the difference between consecutive values of the progressively updated second encryption being determined at least in part by the value of the first encryption;
(b) providing the at least one station of the communications network with signalling means for reading the values of the first and second encryptions and for transmitting an authenticating electrical signal through the network to the another station, with the authenticating signal having a value that is determined, at least in part, by the values of both of the first and second encryptions;
(c) causing the signalling means to read the values of the first and second encryptions and to transmit said authenticating signal as a request by the user to utilize facilities of the communicatins network;
(d) receiving the authenticating signal at the another station and comparing the value represented by the authenticating electrical signal with a predetermined value that is predetermined through a calculation that is made at the another station, wherein said calculation takes into account the values of the first and second encryptions;
(e) permitting use of the facilities of the communications network by the user only if the value of the authenticating signal is identical with the predetermined value; and,
(f) operating the control means to update the value of the second encryption.

31. The method of claim 30 wherein the step of transmitting the authenticating signal includes the step of assembling the authenticating signal from a plurality of multi-bit components, with one of the multi-bit components including a value that is determined, at least in part, by the value of the first encryption.

32. The method of claim 31 wherein another of the multi-bit components that is utilized in assembling the authenticating signal has a value that is assigned to the signalling means as an identifier of the signalling means.

33. The method of claim 31 wherein another of the multi-bit components that is utilized in assembling the authenticating signal has a value that is assigned to the encryption means as an identifier of the encryption means.

34. The method of claim 31 wherein the value of the authenticating signal and the predetermined value are calculated separately and independently at the at least one station and at the another station, respectively, with no indication of the manner in which these values are calculated being transmitted through the communications network, whereby, even if an unauthorized user seeks to obtain access to facilities of the network by monitoring signals that are transmitted through the network, the unauthorized user will not be taught the manner in which the values are calculated.

35. The apparatus of claim 30 wherein the encryption means includes encoding means having at least one algorithm stored therein for encrypting uncoded signals that are transmitted through network.

36. The apparatus of claim 30 wherein the encryption means includes decoding means having at least one algorithm stored therein for decoding encrypted signals that are transmitted through the network.

37. An interactive computer communications security system for serial disposition within a communication link between a host computer and a remote user terminal, said security system comprising:
a portable user-carried device including (i) data storage means for storing readable data having a first machine fixed data portion representative of an assigned user's identify and a second variable data portion which is changed to represent the time of a successful prior communication link usage and (ii) first signal coupling means for coupling signals representative of said first and second data portions from user-carried device;
terminal control means for serial disposition in said communication link and having a second signal coupling means mated with said first signal coupling means for passing onto said communication link onto said communication link authentication signals which are representative of said first and second data portions of the user-carried device; and
said portable user-carried device further comprising security control means which may be coupled to said terminal control means through said first and second signal coupling means and which security control means actively controls a signal dialog over said communication link.

38. An interactive method for effecting user security within a multi-user communication link between a host computer site and plural remote user terminal sites said method comprising the steps of:

maintaining a user-carried device which includes stored machine readable data having a first fixed data portion representative of an assigned user's identity and a second variable data portion which is changed to represent the time of a successful prior communication link usage and which collectively is processed to provide unique authenticating data;

maintaining at said host computer corresponding authenticating data;

accessing and using said stored data at a remote user terminal to generate and transmit said unique authenticating data to said host computer site over said link when the corresponding user desires use of said link;

permitting use of asid link only if the authenticating data received at the host computer site corresponds to the authenticating data maintained thereat; and controlled a signal dialog over said communication link using a mirror processor-based control circuit carried by said user-carried device.

* * * * *